March 20, 1962 — E. BERGMANN — 3,026,407
WELDING APPARATUS

Filed July 25, 1960 — 6 Sheets-Sheet 1

INVENTOR
Erich Bergmann
BY
ATTORNEY

United States Patent Office 3,026,407
Patented Mar. 20, 1962

---

3,026,407
WELDING APPARATUS
Erich Bergmann, Nurnberg, Germany, assignor to Siemens Schuckertwerke Aktiengesellschaft, Erlangen, Germany, a corporation of Germany
Filed July 25, 1960, Ser. No. 45,225
7 Claims. (Cl. 219—131)

This invention relates to arc welding or arc melting and has particular relationship to apparatus for controlling the supply of power to the welding or melting arc.

The use of rectifiers for supplying D.C. arcs, particularly in welding or melting plants, is known. Such systems have smaller no-load losses as well as a good power factor. They constitute a substantially symmetrical load on a three-phase line.

The disadvantage of the known systems of this kind is that they are difficult to control and costly. As is known, regular arc-welding with a manually guided electrode requires a declining current-voltage characteristic, the no-load voltage of which must not exceed a permissible value of, for example, 100 volts or less upon control of the welding current to provide an adequate safeguard against accidents. Within the control region, the current is adjustable by varying the inductivity of a reactor disposed on the three-phase side.

To ensure reliable firing, the known systems require a no-load voltage which is the higher the smaller the welding current. The short-circuit current must not be smaller than the welding current to avoid conditions which would deleteriously affect the penetration and the uniform length of the arc. The amount by which the short-circuit current of the stationary characteristic, that is, the sustained short-circuit current is higher than the welding current has a smaller effect on the welding characteristics than the transient (surge) short-circuit current which must be expected upon "dripping" of unsheathed electrodes. If the current curve were dependent only upon the stationary characteristic, a characteristic $U_2 J_2$=constant (FIG. 1) drawn through the welding point would govern. Upon welding with covered electrodes the dynamic slope of the connecting line between the welding point and the transient short-circuit point has a smaller effect than is the case with welding employing uncovered or bare electrodes, and this is due to the heavy ionization of the arc path by the melting coating.

Thus, a welding rectifier for manual welding operations must have a high static slope in the stationary characteristic to ensure that, upon establishing the arc by contacting the work piece to the electrode, the arc characteristic will be reliably intersected and a smooth, non-soldering transfer of the molten material can take place. Furthermore, there is required a high dynamic slope to prevent during the welding operation the transient short-circuit current from causing a bursting and spattering of the drop.

Figures 1, 3:
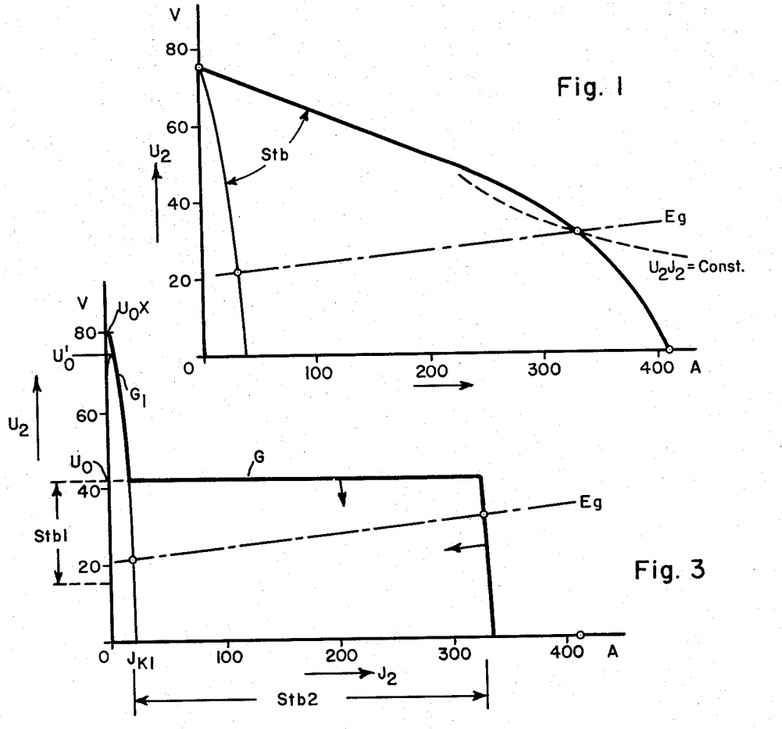
FIGURE 1 is a graph showing the voltage current characteristic of prior art apparatus.
FIG. 3 is a graph showing the voltage-current characteristic of the apparatus shown in FIG. 2.

For controlling the arc welding rectifier, there may be used stepping reactors with control switches associated therewith, plunger coils or variometers for continuous control but subject to undesirable vibratory forces, or current-controlling transducers, the latter having the advantage that they do not require either special control contacts for the operating current or a special protection against mechanical interferences. With these control elements, the falling current-voltage characteristic as shown in FIG. 1 can readily be obtained. The control range is indicated at $Stb$, and the calibration curve is shown at $Eg$. The control and operating flux of the current controlling saturable reactor practically have the same value, that is they have the same copper weight (control and operating winding have the same amount of copper).

With the known arrangements it is necessary, as illustrated in FIG. 1, to associate with the transformer a rectifier and to employ a current, a controlling saturable reactor rated for the ignition voltage and, accordingly for a correspondingly high power. Furthermore, due to the drooping current-voltage characteristic, such system is suitable only for manually-guided electrodes, but not for automatic or semi-automatic shielded arc welding which, with a constant electrode feed and an automatically regulated constant current, requires a constant-voltage source of welding current. The current density and the type of material transfer differs substantially with the welding methods discussed hereinbefore. Whilst there is a distinct formation of drops during normal, manual welding with uncovered electrodes, the material transfer during automatic shielded arc welding with uncovered, relatively thin electrodes occurs predominately as a spray. A steep dynamic slope is advantageous with all welding processes in that it prevents a splattering of falling drops as well as facilitates the initiation of the arc.

The object of this invention is to extend the applicability and, at the same time, reduce the rating of rectifier arrangements for arc welding plants which are supplied from a line through a transformer and are controlled by means of a saturable reactor. The invention accordingly resides broadly in that a transformer rated only for the welding power and having associated therewith a dry type rectifier is controlled by a voltage-controlled and current-limiting saturable reactor, while the requisite dynamic slope and the required firing effect are obtained by a corresponding speed of the current limitation and a parallel-connected firing rectifier of small output relative to the output of the main rectifier or by a reactor for smoothing the direct current. Thus, use is being made of the theory that for initiating and maintaining the ionization of the space between the electrode and the work, it is sufficient to apply an impulse of only a few watt seconds.

With the scheme embodying the teachings of the invention, a better controllability is obtained by the use of a voltage-controlled and current-limiting saturable reactor of low cost, and by the use of a main rectifier rated for a no-load voltage which lies below the firing voltage.

Further features of the invention will now be explained in conjunction with the accompanying drawing showing preferred embodiments of the invention in which.

At the outset a saturable reactor (transducer amplifier, magnetic amplifier) is usually defined as a device for controlling a voltage or a current by utilizing the saturation of ferromagnetic materials. The transducer comprises one or a plurality of saturable reactors and rectifier valves, as the case may be. The rectifier valves may comprise silicon rectifiers which are particularly suitable due to their high inverse voltage and load capacity combined with their small size and high efficiency as well as their insensibility to atmospheric conditions.

Figure 2:
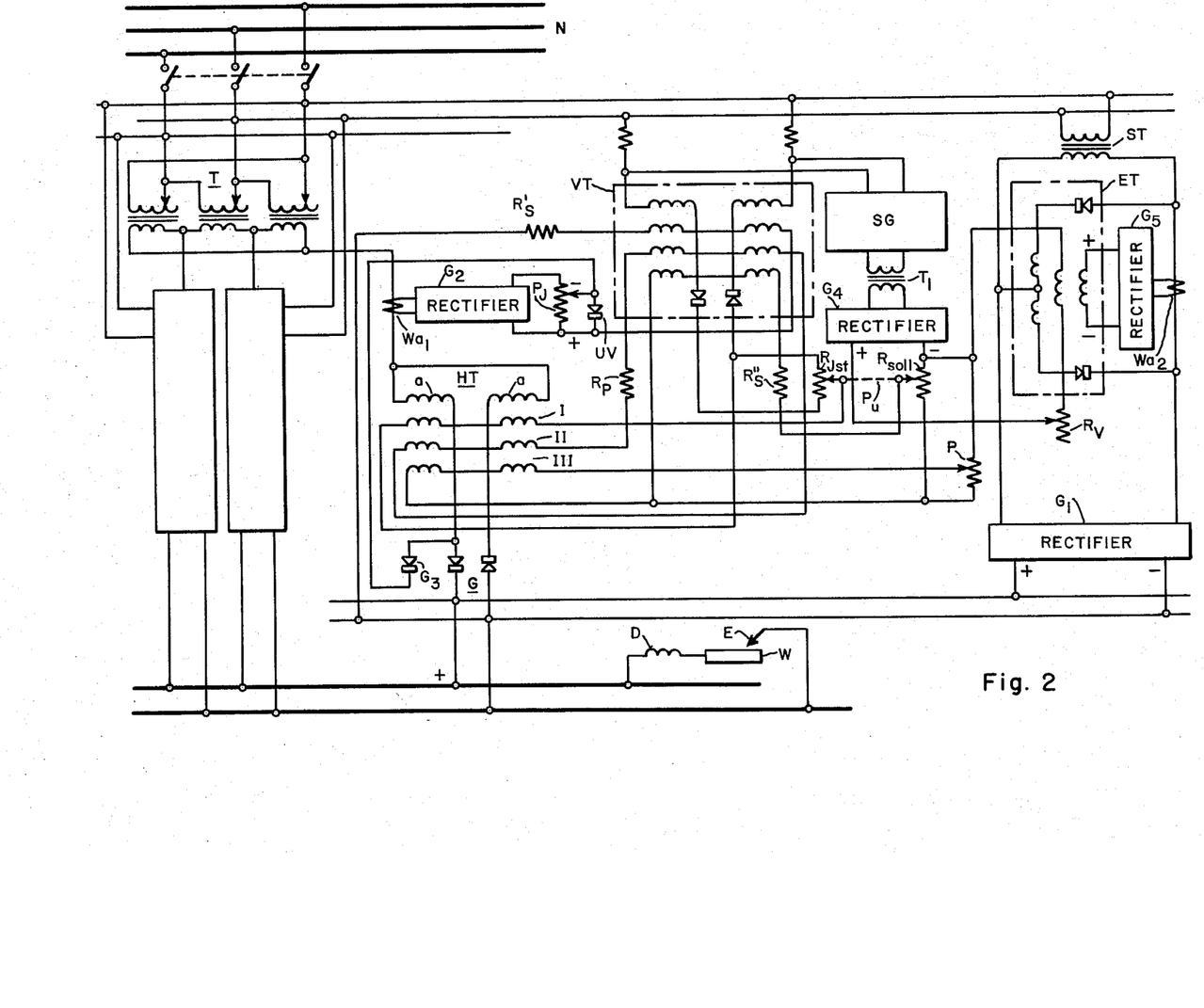
FIG. 2 is a schematic of a preferred embodiment of this invention.

A welding rectifier system embodying the inventions is shown in simplified form in FIG. 2. Essentially, it comprises a main rectifier G supplied from line N through a transformer T adjustable for various line voltages, said main rectifier G being adapted to supply the arc (not shown) between an electrode E and a work piece W. For the purpose of controlling the arc current, the rectifier circuit has associated therewith operating winding $a$ of a voltage-controlling main transducer HT. The main transducer HT has three control windings I, II and III for each operating winding, the control windings permitting a control of the magnetization of the core and, consequently, a control of the attenuation of the operating current.

The main rectifier G has connected in parallel thereto an auxiliary rectifier $G_1$ which is adapted to produce the required firing voltage. Since the no-load voltages of these two rectifiers are of different values, the used rectifier elements must be rated for the higher no-load voltage, that is, the firing voltage. For this purpose, silicon rectifier with their relatively high reverse voltage are particularly suitable.

As shown in FIG. 3 in which voltage U2 is plotted vertically and current, J2, horizontally, the no-load voltage $U_0$ of the main rectifier G amounts to 42 volts, for example, and the no-load voltage $U_0X$ of the auxiliary rectifier $G_1$ amounts to 80 volts. Since these rectifiers G and $G_1$ are connected in parallel circuit relationship, the rectifier current will be added, the load of the rectifiers being dependent upon the voltage occurring when the load is connected. According to FIG. 2, the auxiliary rectifier $G_1$ is supplied by a leakage-field (high impedance) transformer ST for obtaining a drooping current-voltage characteristic, said leakage-field transformer being connected to the tapped primary winding of the main transformer T. It is also possible to supply the auxiliary rectifier $G_1$ directly from the transformer T through a reactance.

The main rectifier G is required to deliver only the arc voltage necessary for welding, since starting and maintaining the arc is effected by the auxiliary rectifier $G_1$. With a welding voltage of, for example, 42 volts, the apparatus embodying the invention may also use deep-penetration type electrodes which is not feasible with conventional welding plants of this type since their rated current has associated therewith a smaller arc voltage not suitable for deep-penetration welding.

The main rectifier G is controlled through the three groups of control windings of the main transducer HT. The first control winding group I is connected through the resistance $R_{Jst}$ of a tandem potentiometer $P_U$ for controlling the voltage to the operating winding (not shown) of the pre-stage transducer VT supplied by the transformer T. The second control winding group II is connected through a resistor $R_P$, in series therewith, to one of the control windings of the pre-stage transducer VT in order to provide a return path for preventing oscillations. The third control winding group III is connected to a voltage dividing resistor P which lies parallel to the resistant $R_{Soll}$ of the potentiometer $P_U$. Through P there is obtained a suitable pre-magnetization and thereby the desired selection of the operating region along the control characteristic of the main transducer HT. The current-controlling potentiometer $P_J$ is depedent upon the current of the main rectifier G and is supplied through a transformer $Wa_1$ and a rectifier $G_2$. $P_J$ is connected through an auxiliary rectifier $G_3$, for blocking the firing voltage, in series with the actual voltage and a resistor $R'_s$ associated with the admissible voltage variation or the shortest response-time, respectively, of the pre-stage transducer, to a further control winding of the pre-stage transducer VT which counteracts the nominal (set)-value control winding. The transformer $Wa_1$, upon reaching the limiting current, that is, the point at which transformer control current equals actual control current value, applies an additional voltage to the corresponding control circuit of the pre-stage transducer VT which, in turn, demagnetizes the main transducer HT. An overflow valve UV, for example comprising a silicon rectifier cell, causes the current regulation to supersede the voltage regulation only at such time when the limiting current has been reached.

The input side of the pre-stage transducer VT is connected to a voltage stabilizer SG of conventional type, the output of said voltage stabilizer being connected through a transformer $T_1$ and a rectifier $G_4$ to the voltage divided assistance $R_{Soll}$ of the potentiometer $P_U$, supplying therethrough the nominal (set)-value control winding of the pre-stage transducer VT. From this it follows that the fluctuations of the supply voltage and the voltage drop across the welding rectifier when the load is connected are regulated in the pre-stage transducer through a comparison between the nominal or desired (set) value and the actual value of the voltage. For this purpose, a resistor $R''_s$ which is in series with the variable resistor $R_{Soll}$ ad associated with the permissible voltage variations or shortest response time, respectively, of the pre-stage transducer, is connected to the nominal-value control winding of the pre-stage transducer VT. The main and pre-stage transducer are of conventional type.

The auxiliary rectifier $G_1$ for supplying the firing voltage separates the firing voltage from the no-load voltage. In this connection, a transducer of the single-phase doubler type ET has its operating winding connected to the secondary terminals of the leakage-field transformer ST, as shown in FIG. 2. One of the control windings of the transducer is connected in series with a resistor $R_V$ to the rectifier $G_4$ supplied from the voltage stabilizer SG. Another one of its control windings is connected to rectifier $G_5$ supplied from the current transformer $Wa_2$ or across the forward voltage of a silicon cell $Si$. By means of this arrangement, the firing voltage $U_0'$ (FIG. 3) of the auxiliary rectifier $G_1$ is automatically regulated upon the transition to no-load operation to correspond to the no-load voltage $U_0$ of the main rectifier G.

The control of the operating voltage (control range $Stb1$ FIG. 3) required for the automatic and semi-automatic shielded arc welding with a consumable electrode is effected in known manner by varying the control current by means of the potentiometer $P_U$. The operating current is controlled during normal manual welding (control range $Stb2$ FIG. 3) through current limitations by connecting the nominal (set)-value control voltage in series with the voltage across the potentiometer $P_J$. The rectifier $G_2$ lies across the current transformer $Wa_1$ traversed by the operating current.

Figure 4:
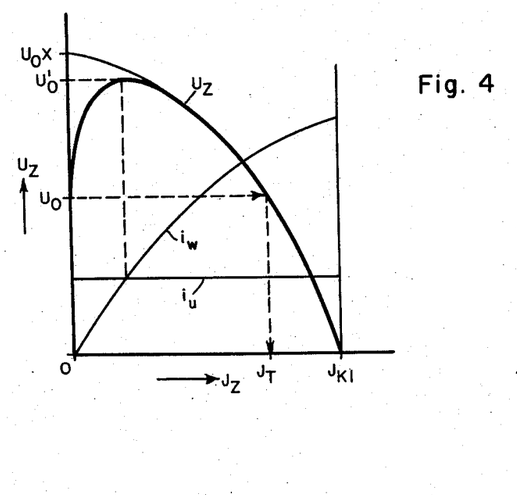
FIG. 4 is a graph showing the voltage-current characteristic of the high voltage supply of FIG. 2.

The drop of the firing voltage to no-load voltage or welding voltage after the firing is indicated in FIG. 4 wherein the characteristic for $U_Z$ plotted vertically corresponds to the current-voltage curve of the auxiliary rectifier $G_1$ in FIG. 3 and drawn to a different scale. The voltage-dependent control current $i_u$ of the transducer ET and the current-dependent control current $i_w$ of said transducer counteract each other and are so proportioned that they cancel each other when the voltage $U_Z$ is at a maximum, that is, within the region of the firing voltage. To the right of the point of intersection of the two control currents, the transducer ET begins to furnish an operating current $J_Z$ of substantial value, and to reduce the voltage $U_Z$ with the increase of said current. For the operation of the system it is important that the desired no-load voltage is set up with a control current, irrespective of which direction said control current may have with respect to the current-dependent demagnetizing control current. The current transformer $Wa_2$ with the auxiliary rectifier $G_5$ must block the transducer ET even for a small primary current to provide a firing voltage $U_0'$ which is as high as feasible and which closely approaches the no-load voltage $U_0X$ of the leakage-field transformer ST. Therefore, the auxiliary rectifier $G_5$ must be rated for the higher secondary rated current of the current transformer. It is simpler and just as effective to use instead of the current transformer and the auxiliary rectifier a silicon cell $Si$ which is characterized by a low forward voltage of approximately 0.7 volt. The transformer ST associated with the firing rectifier $G_1$ can be used only as a leakage-field transformer since with a normal transformer or with an auxiliary winding on the main transformer and with practically a constant voltage, the attainable speed of the current limitation is not nearly enough to obtain a firing peak voltage approaching the voltage of the firing transformer.

It is to be noted that all rectifiers are arranged in bridge connection or center-point connection with filter capacitors (not shown), and that at least the rectifiers G and $G_1$ comprise silicon rectifier elements. The star connection which would result in a saving in saturable reactors and rectifier elements is unsuited for use with the welding rectifier since, in view of the relatively high operaitng currents, a stable control, free of loops, of the saturable reactors cannot be accomplished despite the application of high control input power. In certain circumstances, however, it may be advantageous to use the duplex star connection or the duplex star connection with an interface transformer—despite the higher cost of the transformer.

Since the control input power of the voltage-controlling main transducer HT is very small, it is also possible to hold the voltage constant by means of a Zener diode, for example a silicon or germanium Zener diode. The advantage of such diode lies in its simple, maintenance-free design and its small dimensions.

Figure 5:
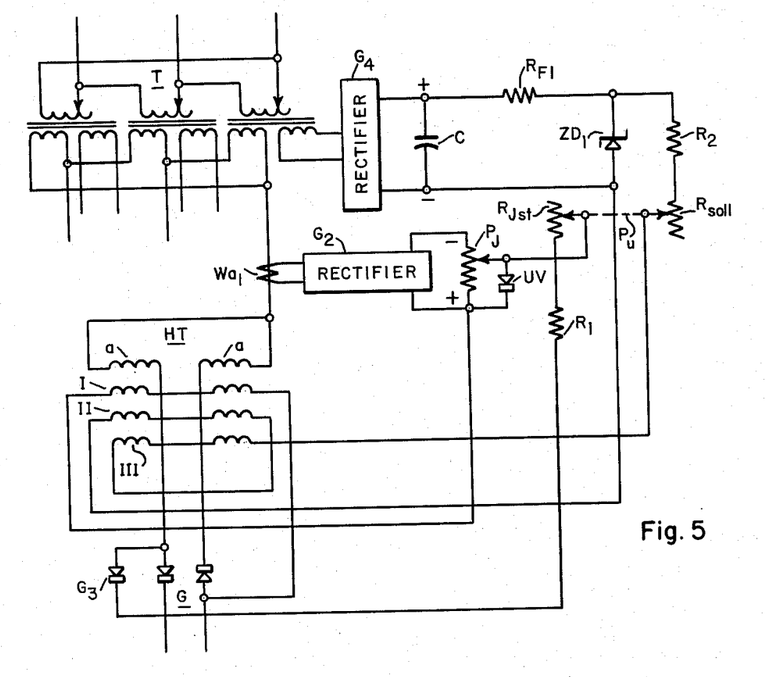
FIG. 5 is a fragmental schematic showing a modification of this invention.

The diode functions as a resistance having a constant voltage drop, with a fixed resistance connected in series therewith, as shown in FIG. 5. Those elements in FIG. 5 which are identical to elements shown in FIG. 2 are designated by the same reference characters.

In FIG. 5 there is shown only the control circuit of the main transducer HT. The Zener diode utilized in the arrangement shown in FIG. 5 replaces the pre-transducer VT and the voltage stabilizer SG employed in the apparatus illustrated in FIG. 2.

The control-winding group I of the voltage-controlling main transducer HT is connected through fixed resistor $R_1$ to the resistance $R_{Jst}$ of the potentiometer $P_U$ and also tied into the actual magnitude of the voltage through the current potentiometer $P_J$, which is supplied from the current transformer $Wa_1$ and the rectifier $G_2$, and bridged by a limiting valve UV. In the same manner as shown in FIG. 2, the valve UV functions to cause the current regulation to supersede the voltage regulation only at a time when the current limit has been reached. The other two control-winding groups II and III are arranged in series and connected through resistance $R_{Soll}$ of the voltage potentiometer $P_U$ and a fixed series resistance $R_2$, to the Zener diode $ZD_1$ having a fixed resistor $F_{F1}$ connected in series therewith. As in FIG. 2, the voltage potentiometer $P_U$ comprises a tandem type potentiometer so that its actual-value resistance portion and its nominal (set)-value resistance portion are permanently interconnected mechanically whereby both can be effective at the same time only.

As compared to the system illustrated in FIG. 2, the scheme according to FIG. 5 has the additional advantage that, due to the absence of the pre-stage transducer VT, there is only the response time of the main transducer so that oscillating (hunting) of the nominal (set)-value control current cannot occur. Thus, there is no need for a return path for suppressing such oscillations. Since the time of response of the main transducer is essentially below that of the pre-stage transducer, it is not necessary to provide in the scheme according to FIG. 5 a separate control resistance $R_S'$ or $R_S''$ in this manner, the Zener voltage of a single silicon diode may be sufficient to provide a satisfactory control.

Figure 6:
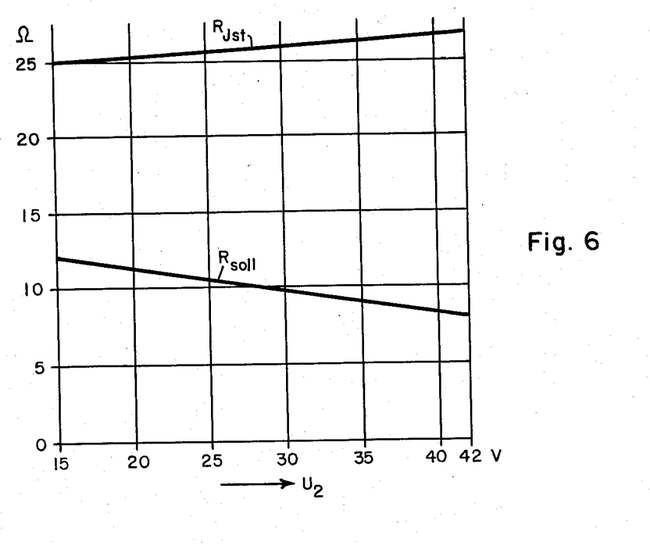
FIG. 6 is a graph illustrating an aspect of the operation of the apparatus shown in FIG. 5.

This arrangement results in a very small control current which lies within the operating range of a silicon Zener diode. For the control range $Stb1$ (FIG. 3) of from 15 to 42 volts, the resistances $R_{Jst}$ and $R_{Soll}$ in the embodiment now described have values as shown in FIG. 6.

Figure 7:
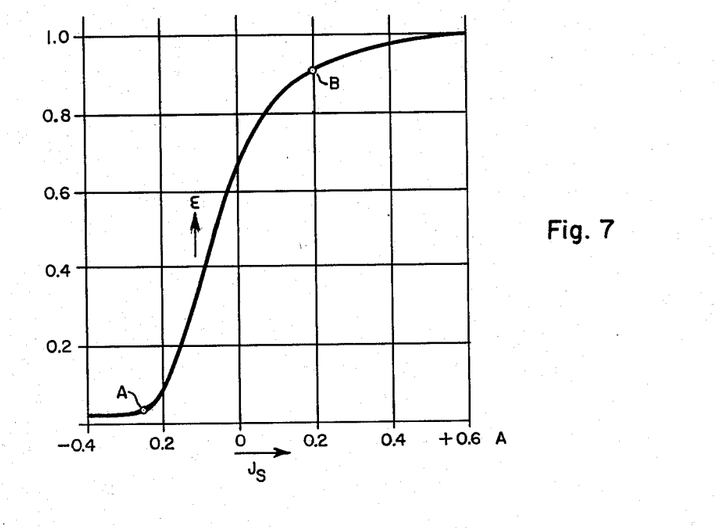
FIGS. 7 and 8 are graphs showing certain properties of the main transducer (HT) used in the practice of this invention.
Figure 8:
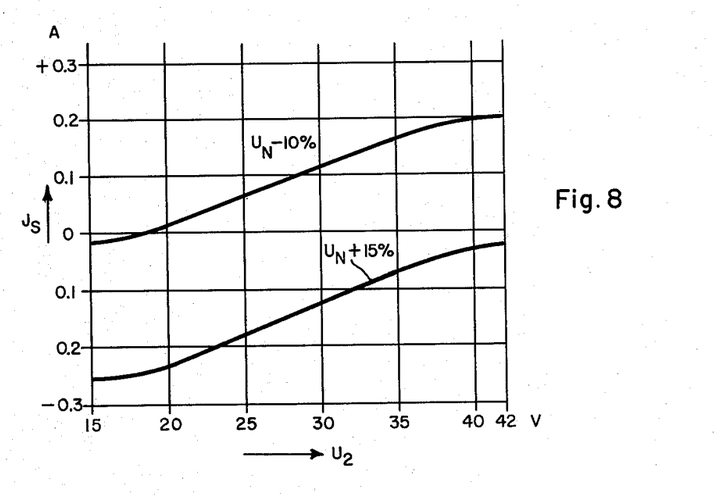

FIG. 7 shows the dependence of the resulting control current $J_S$ of the main transducer HT (with respect to the rated number of turns of the control winding, ampere turns) upon the ratio $\epsilon$ of the respective load voltage to the load voltage at full saturation of the main transducer. FIG. 8 shows the dependence of the control current $J_S$ upon changes in the line voltage U2. In FIG. 7, the control current changes between points A and B along the control characteristic shown therein. From this it can be seen that, contrary to FIG. 2, the scheme shown in FIG. 5 would not require a stable premagnetization by means of a special control winding.

Figure 9:
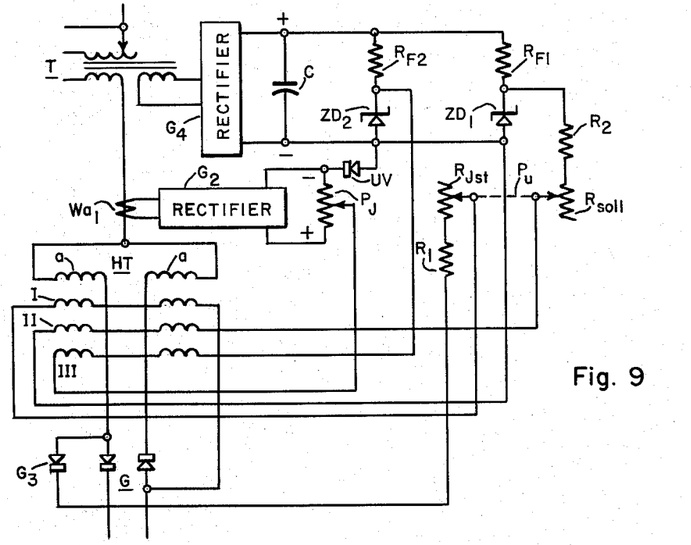
FIG. 9 is a fragmental schematic showing a further modification of this invention.
Figure 10:
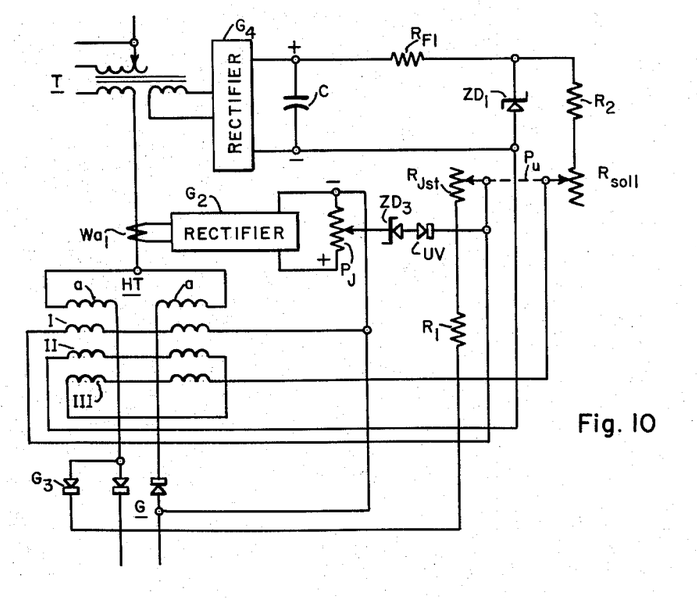
FIG. 10 is another fragmental schematic showing a still further modification of this invention.

To reduce the load on the Zener diode $ZD_1$ in FIG. 5, the control-winding groups II and III are connected in series circuit relationship. In many cases, the control power is so small that the Zener diode is not over-loaded even if only one single control-winding group is utilized to control the nominal (set)-value. In this event, individual control windings are available for the current limitation and for the actual-value control. In this connection, the voltage across the current potentiometer $P_J$ must be compared against a fixed reference voltage; as said reference voltage is reached, the demagnetization of the saturable reactors and, consequently, the current regulation are initiated. The required fixed reference voltage can be easily set up by the use of a second Zener diode $ZD_2$. FIG. 9 shows this circuitry. The reference characters in FIG. 9 are the same as in FIGS. 2 and 5. This scheme illustrated in FIG. 9 differs in its operation from FIGS. 2 and 5 in that the current limitation or current regulation, too, is independent of fluctuations of the respective line voltage. However, the current regulation can be rendered independent of fluctuations of the line voltage also with circuitries such as shown in FIG. 2 and FIG. 5 by applying the additional voltage to the demagnetizing actual-value control circuit through a Zener diode $ZD_3$, as shown in FIG. 10. The overflow (limiting) valve UV in FIGS. 9 and 10, which may comprise a silicon rectifier cell, ensures that no current can flow through the Zener diode $ZD_3$ in the forward direction.

With the main transducer and a silicon Zener diode, fluctuations of the line voltage in the region of from $+15\%$ to $-10\%$ can be regulated up to $\pm 2\%$ with a time of response of 0.1 second. If, in exceptional cases, the regulating speed and the regulating accuracy must be higher, further modifications in addition to those described in conjunction with FIGS. 2, 5, 9 and 10 are possible. Thus, more silicon Zener diodes may be connected in series relationship with each other. There may also be used a transistorized amplifier or a two-point regulator of conventional type. With the high output of the two-point regulator, the required regulating speed can be attained even in difficult cases.

During no-load operation, the voltage, as a function of time, is comprised of the slightly pulsating voltage of the main rectifier and of the rectified halfwaves of the firing rectifiers. Thus, the voltage across the output terminals of the rectifier arrangement would readily be higher than the 42 volts of the main rectifier, and there would be obtained substantially differing voltage values for the mean value, as measured by a moving-coil instrument, and for the effective value, as measured by a moving-iron instrument. This condition is readily changed by automatically decreasing also the voltage of the main rectifier during no-load operation. For this purpose, the simplest way is to use the potential difference between the terminals of the main rectifier and of the firing rectifier, which terminals are separated from each other by valve $G_3$ (FIG. 2). On the predetermined nominal or desired value of the voltage of the main rectifier, said potential difference amounts to from 10 to 50 volts during no-load operation, and it drops to zero as soon as a load is connected to the rectifier. Hence, the no-load voltage of the main rectifier can be regulated to such value that the terminal voltage of the welding rectifier will remain at the permissible value of 42 volts during no-load operation.

By assigning the functions of the welding rectifier system to the main rectifier and the auxiliary rectifier it is achieved that the main rectifier need be rated only for an operating voltage which lies substantially below the firing voltage so that, for the same welding power, said main rectifier may be rated for a correspondingly lower power which, in the embodiment providing for a reduction of from 75 to 42 volts, amounts to 56%. The voltage-controlling main transducer HT with its low control output need also be rated only for a power reduced to 56%. The auxiliary rectifier has a rating of only a fraction of the power rating of the main rectifier which, in the embodiment, amounts to about 8%.

The use of a voltage-controlling main transducer with current limitation makes the welding rectifier system embodying the teachings of the invention equally well applicable to all welding processes since it is possible to operate with a practically constant current as well as a practically constant voltage. The voltage regulation permits the apparatus according to the invention to operate reliably irrespective of any fluctuations of the line voltage. Adjusting the welding current through current limitation is practically independent of the heating up of the welding rectifier. The current transformer and the control winding are designed to provide for adequate ventilation so that an appreciable increase of resistance may not occur during extended operation underload because of the great time constant and forced ventilation. Furthermore, the resistance of the current transformer winding is negligibly small as compared to the load resistance connected to the current transformer and wound from constantan wire.

Because of the decrease of the no-load voltage of the main rectifier G, the system according to the invention is also safe for its use in the construction of boilers and containers. The high firing voltage by the auxiliary rectifier $G_1$ facilitates considerably operations for welding thin sheet metal. Due to the control by means of a voltage-controlling transducer, the transient short-circuit current upon the transition from no-load operation to short-circuit operation is not higher than the sustained short-circuit current or not higher than the limiting or critical current determined by means of the current potentiometer $P_j$, respectively. Upon the transition from welding to short-circuit operation, however, which is an operating condition recurring during manual welding (particularly with uncovered electrodes) up to 50 times per second due to dripping, the transducer would readily allow for a substantial transient short-circuit current, the duration of which would depend upon the speed at which current limitation takes place. After the short-circuit or upon the interruption of the short-circuit by the falling drop, that is, after 3 to 10 milliseconds, the welding current preferably should reach its predetermined value without delay. Thus, the transducer would be required to cut-off and reopen very quickly if the current increase at the moment of the formation of the drop is not to manifest itself in undesirable spattering of the molten material. Therefore, to relieve the transducer, the present invention provides for smoothing the welding current by means of a regular air-core reactor (D in FIG. 2). For this purpose, a reactor of relatively small size will suffice. In this manner, the system according to the invention has a dynamic behavior as favorable as that of conventional welding converters, but without the drawbacks inherent in the latter. The sustained short-circuit current or the limiting current is reached practically without a delay so that a sufficiently high current will be available upon firing, however without a current peak causing the molten material to splatter. The current peaks occurring during the welding operation are so small that a special protection of the silicon rectifier cells against prohibited values of $i^2 dt$ is superfluous. Upon the transition from short-circuit operation to no-load operation, the high firing voltage is also obtained practically without delay since, with an alternating current of 50 cycles, the voltage rises from 0 to its maximum value within 0.0005 second. The firing impulse is considerably stronger than in the welding converter, without exceeding the permissible duration of 0.2 second. With the welding rectifier, as compared to the welding converter, there is no blowing effect which might deflect the arc in an undesirable manner, and this is due to the particular shape of the current wave which consists of only a few half-waves.

The high firing voltage is reinforced by the self-induced voltage of the smoothing reactor D. In accordance with the broader aspects of this invention, the smoothing reactor may be of such size, that the self-induced voltage is so effective that the firing rectifier $G_1$ can be omitted. This eliminates also all of those features which are necessitated by the parallel connection of the main rectifier G and the auxiliary rectifier $G_1$. In this connection, it is not possible to use the reactor D instead of the current transformers $Wa_1$ for limiting the current. The reactor voltage has an appreciable upper harmonic which is substantially greater with a smaller reactor current than with a higher current. However, the current transformers $Wa_1$ and the rectifier cells $G_2$ can be replaced with a shunt connected in series with the reactor D, whereby the layout of the system according to the invention is considerably simplified. For example, the elements remaining in the system comprise the transformer T, the transducer HT with the rectifier cells, the regulator with the two nominal-value adjusting means, to control-circuit reactors and the shunt, the reactor D and a resistor connected as a basic load. In addition, the shunt has the great advantage of a rectilinear characteristic with respect to the load current and the voltage drop. In this manner, there is obtained for the main rectifier G a static characteristic which corresponds to the ideal curve according to FIG. 3. This not only holds the available welding power UJ at a maximum, but also results in a fairly uniform distribution of the load if a plurality of welding rectifier units are connected in parallel relationship.

The principal advantage of the system according to the invention resides in the simple and economical construction employing maintenance-free static elements with flow control inputs and in the infinite adjustment of the desired values of voltage U and current J merely by the operation of two potentiometers which also are suitable for remote control; another advantage resides in that, due to the low no-load voltage, the voltage across the main transducer is so small and the power factor is so high that a compensation of the inductive load is not necessary. The system embodying the teachings of the invention is suitable not only as a UI-welding rectifier, but also as a current source for vacuum type arc furnaces and for other purposes where it is necessary to stabilize high temperatures by means of the arc.

In summary the invention disclosed above is a rectifier system for arc welding and fusion plants which is supplied through a transformer from the line and which is controlled by means of a transducer comprising reactors and valves. The rectifier system includes a main rectifier, rated for the welding power, with a main transducer, and a parallel-connected auxiliary rectifier for furnishing the firing voltage, the auxiliary rectifier having a small power output as compared to the main rectifier. Instead of the auxiliary rectifier, it is also feasible in accordance with the broader aspects of this invention to use the smoothing reactor in the load circuit for furnishing the firing voltage. The main transducer may be controlled, by a regulator in the control circuit which is adapted to hold the voltage constant and to limit the current. This apparatus is well suited for regular manual welding with a constant welding current as well as for semi-automatic and automatic shielded arc welding with a constant welding voltage.

During welding with a constant current, the metallic drops separating from the welding electrode and, forming short circuits between the electrode and the work piece must not be caused to burst by a current increase which is too rapid and too high. For welding with a constant voltage, it is necessary to produce an abrupt current surge to effect a reliable starting of the arc. These, in themselves, contrasting welding conditions are the more worked the higher the power of the regulator and of the smoothing reactor connected in the load circuit.

In accordance with an additional aspect of the invention, simple means is provided for relieving the regulator and the smoothing reactor to keep the rating of these elements as small as practicable and, at the same time improve the welding characteristics.

Figure 11:
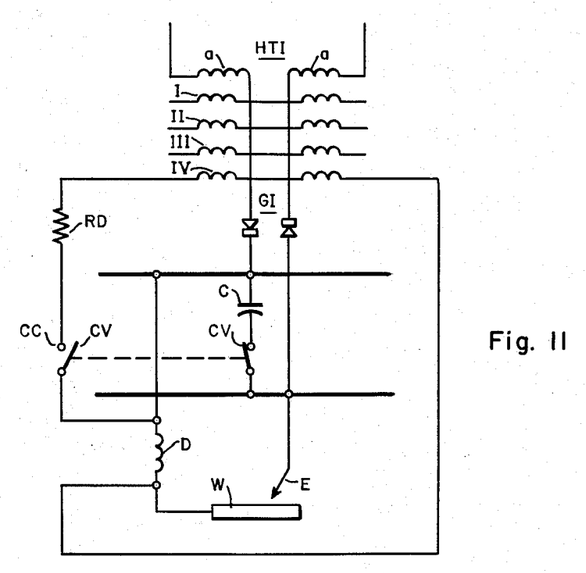
FIG. 11 is a further fragmental schematic showing still another modification of this invention.
Figure 12:
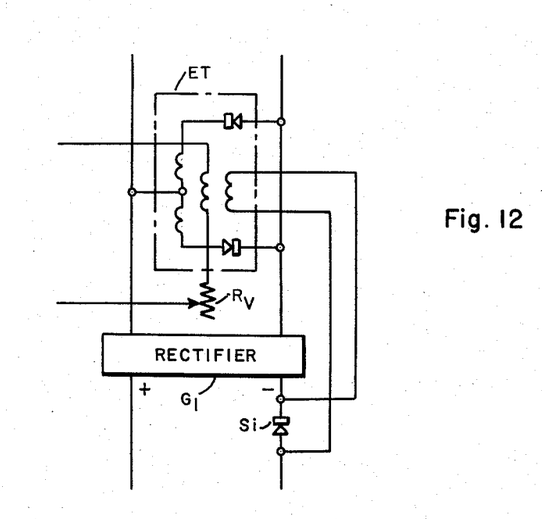
FIG. 12 is still a further fragmental schematic showing a further modification of this invention.

This aspect of the invention is shown in FIG. 11. Upon welding with a constant current, the dynamic welding properties of the rectifier arrangement GI according to the invention are considerably improved by connecting across the smoothing reactor D in the load circuit, a control winding IV of the main transducer HT1 through a resistor RD in such manner that the current surges are attenuated. This dynamic feedback practically suppresses the current peaks completely whereby a particularly smooth flow of the molten metal is obtained. Consequently, the effect of the smoothing reactor is enhanced.

During welding with a protective gas and a constant voltage, the electrode which is fed by motor must be caused to melt and the arc must be fired, when the electrode contacts the work, by a momentarily applied current surge. For this purpose, the invention not only provides that the above-mentioned dynamic feedback is disconnected, but also that the starting operation is supported by a condenser connected across the output of the main transducer and adapted to be charged thereby, said capacitor C functioning at the moment of the short-circuit to apply its charge to the firing point. These two actions affect the transducer or the welding position, respectively, directly so that load is being taken from the regulator. Consequently, the smoothing reactor and the regulator can be substantially smaller than in the absence of these features. The features of the invention as such require only a control switch "Constant Current-Constant Voltage" for the dynamic feedback, and the capacitor C for storing the firing impulse. It can thus be seen that the welding properties are improved at little cost.

It is noted that with the arrangement explained above, the feedback may be effective only during welding with a constant current and not during welding with a constant voltage. The capacitor C need not necessarily be switched since the firing impulse can only serve to improve the firing even during welding with a constant current.

I claim as my invention:

1. A rectifier system for arc welding or fusion plants for arc welding or melting work supplied from a line through a transformer and controlled by means of a transducer, characterized in that said rectifier system comprises a main rectifier having output terminals connected to supply arc current to said work and rated for the welding power and including a voltage-controlling and current limiting main transducer having a control circuit, and a parallel-connected auxiliary rectifier connected to said work for supplying the firing voltage, said auxiliary rectifier having a small power output relative to the main rectifier, and regulating means connecting said output terminals to said control circuit for maintaining constant the voltage of said main rectifier, said regulator means including a pre-stage transducer having control winding means, a voltage stabilizer connected to said source for deriving a stable voltage with line-voltage fluctuations suppressed, a set-voltage potentiometer connected to said stabilizer for deriving said set voltage, and a resistor for decreasing the time of response of said regulator means and means connected to said last-named control winding means for impressing said set voltage thereon in series with said time response decreasing resistor.

2. A rectifier system for arc welding or fusion plants for arc welding or melting work supplied from a line through a transformer and controlled by means of a transducer, characterized in that said rectifier system comprises a main rectifier having output terminals connected to supply arc current to said work and rated for the welding power and including a voltage-controlling and current-limiting main transducer having a control circuit, and a parallel-connected auxiliary rectifier connected to said work for supplying the firing voltage, said auxiliary rectifier having a small power output relative to the main rectifier, and regulating means connecting said output terminals to said control circuit for maintaining constant the voltage of said main rectifier, said regulator means including a Zener diode connected to said source for deriving from said source a voltage limited by said diode, a set-value variable resistor connected to said diode for deriving a set-value voltage and an actual-value variable resistor connected to said terminal for deriving therefrom a voltage dependent on the actual arc voltage, and means impressing said set-value voltage and said actual-value voltage in regulating relationship on said control circuit, said variable resistances being of such magnitude that the effective control current of said transducer utilizes the linear portion of the control characteristic of said transducer.

3. A rectifier system for arc welding or fusion plants for arc welding or melting work supplied from a line through a transformer and controlled by means of a transducer, characterized in that said rectifier system comprises a main rectifier having output terminals connected to supply arc current to said work and rated for the welding power and including a voltage-controlling and current-limiting main transducer, and an auxiliary rectifier, a leakage-field transformer, means including said transformer for connecting said auxiliary rectifier in direct-current power deriving relationship with said source, means connecting said auxiliary rectifier in parallel with said main rectifier, the voltage output of said auxiliary rectifier being adequate to fire said arc reliably and said auxiliary rectifier having a small power output compared to said main rectifier, an auxiliary transducer having control-winding means and output-winding means, means connecting said output-winding means in parallel with said auxiliary rectifier, and means connected to said control winding means for supplying said control winding means with first control current dependent on the no-load voltage setting of said system and with second control current dependent on the load of said auxiliary rectifier, said second control current having a demagnetizing effect on said auxiliary rectifier.

4. A rectifier system for arc welding or fusion plants for arc welding or melting work supplied from a line through a transformer and controlled by means of a transducer, characterized in that said rectifier system comprises a main rectifier having output terminals connected to supply arc current to said work and rated for the welding power and including a voltage-controlling and current-limiting main transducer, and an auxiliary rectifier, a leakage-field transformer, means including said transformer for connecting said auxiliary rectifier in direct-current power deriving relationship with said source, means connecting said auxiliary rectifier in parallel with said main rectifier, the voltage output of said auxiliary rectifier being adequate to fire said arc reliably and said auxiliary rectifier having a small power output compared to said main rectifier, said parallel connecting means including a rectifier valve, an auxiliary transducer having control-winding means and output-winding means, means connecting said output-winding means in parallel with said auxiliary rectifier, means connected to said control winding means for supplying said control winding means with first control current dependent on the no-load voltage setting of said system and means connected to said valve and said control winding means for deriving from said valve a voltage dependent on the forward potential drop across said valve to supply said control winding means with second control current dependent on the load of said auxiliary rectifier, said second control current having a demagnetizing effect on said auxiliary rectifier.

5. A rectifier system for arc welding and fusion (melting) plants which is supplied from a line through a transformer rated for welding power and a main rectifier, and which is controlled by a voltage-controlling and current-limiting main transducer having control winding means, the voltage supplied through said main transducer being substantially lower than that required to fire an arc reliably, and a parallel-connected auxiliary rectifier capable of supplying reliable firing voltage, said auxiliary rectifier having a small output as compared to the output of the main rectifier, said rectifier system including a regulator connected to said control winding means and adapted to hold the voltage of the main rectifier constant, and a smoothing reactor disposed in welding circuit, characterized in that upon welding with a constant current, and for relieving the regulator and the smoothing reactor, said smoothing reactor has connected thereto through a resistance said control winding means in current surge attenuating relationship.

6. A rectifier system for arc welding and fusion (melting) plants which is supplied from a line through a transformer rated for welding power and a main rectifier, and which includes as control means a voltage-controlling and current-limiting main transducer having control winding means and output winding means, the voltage supplied through said main transducer being lower than that required for firing the arc reliably, and a parallel-connected auxiliary rectifier capable of supplying reliable firing voltage, said auxiliary rectifier having a small output as compared to the output of the main rectifier, as well as a regulator connected to said control winding means and adapted to hold constant the voltage of the main rectifier, and a smoothing reactor disposed in the welding circuit, characterized in that particularly for welding with a protective gas and a constant voltage, the main transducer has connected across the output windings thereof a capacitor adapted to be charged by the output voltage of said transducer, for facilitating the firing.

7. Apparatus for arc welding or arc melting work from an alternating-current power source comprising main rectifier valve means, means connected to said valve means for connecting said valve means in a rectifying network with said source, said network being capable of delivering power adequate to maintain an arc for welding or melting at a voltage substantially lower than that required to fire an arc reliably, means connected to said network for connecting said network in direct-current arc power supply relationship with said work, means to be energized from said source and having output terminals for impressing in parallel with said network a voltage adequate to fire reliably an arc for welding or melting, said impressing means being capable of delivering power of a magnitude substantially lower than the power deliverable by said network, an auxiliary transducer having output winding means and control winding means, means connecting said output winding means in parallel with said output terminals, and means connected to said last-named control winding means for controlling the output of said last-named output winding means in dependence upon the load on said firing voltage impressing means.

References Cited in the file of this patent
UNITED STATES PATENTS

| | | |
|---|---|---|
| 2,763,811 | Williams | Sept. 18, 1956 |
| 2,777,973 | Steele et al. | Jan. 15, 1957 |
| 2,924,750 | Mulder | Feb. 9, 1960 |
| 2,927,143 | Jensen | Mar. 1, 1960 |